United States Patent
Takahashi et al.

(10) Patent No.: US 10,613,518 B2
(45) Date of Patent: Apr. 7, 2020

(54) SERVO CONTROL DEVICE

(71) Applicant: Mitsubishi Electric Corporation, Tokyo (JP)

(72) Inventors: Kimiyuki Takahashi, Tokyo (JP); Shohei Takesako, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/461,796

(22) PCT Filed: Mar. 26, 2018

(86) PCT No.: PCT/JP2018/012050
§ 371 (c)(1),
(2) Date: May 17, 2019

(87) PCT Pub. No.: WO2019/186625
PCT Pub. Date: Oct. 3, 2019

(65) Prior Publication Data
US 2019/0377328 A1   Dec. 12, 2019

(51) Int. Cl.
G05B 19/4155   (2006.01)
G05B 19/414   (2006.01)
H02P 5/00   (2016.01)

(52) U.S. Cl.
CPC ....... G05B 19/414 (2013.01); G05B 19/4155 (2013.01); *G05B 2219/36245* (2013.01); *H02P 5/00* (2013.01)

(58) Field of Classification Search
CPC .............. G05B 19/414; G05B 19/4155; G05B 2219/36245; G05B 19/19; G05B 2219/34015; H02P 5/00

USPC ................................ 318/34, 560, 568.1, 600
See application file for complete search history.

(56) References Cited

U.S. PATENT DOCUMENTS

2013/0285589 A1   10/2013   Sugie et al.
2015/0355633 A1*  12/2015   Nagatani ............ G05B 19/4155
                                                          700/275
2016/0139586 A1   5/2016    Matsumoto et al.

FOREIGN PATENT DOCUMENTS

| JP | 61-269687 A | 11/1986 |
| JP | 8-103092 A | 4/1996 |
| JP | 2004-110700 A | 4/2004 |
| JP | 2006-221558 A | 8/2006 |

(Continued)

OTHER PUBLICATIONS

International Search Report dated Jun. 19, 2018 for PCT/JP2018/012050 filed on Mar. 26, 2018, 1 page of International Search Report in Japanese Language only.

(Continued)

*Primary Examiner* — Bickey Dhakal
*Assistant Examiner* — Zemenay T Truneh
(74) *Attorney, Agent, or Firm* — Xsensus LLP

(57) ABSTRACT

A servo control device includes an instruction controller to generate and transmit a preliminary instruction and a sequential instruction to a following controller, and the following controller to drive and control a motor on the basis of the preliminary instruction stored in a preliminary instruction storage unit when an external input signal is input, and subsequently drive and control the motor on the basis of the sequential instruction stored in a sequential instruction storage unit.

10 Claims, 5 Drawing Sheets

(56) References Cited

FOREIGN PATENT DOCUMENTS

| JP | 2016-99720 A | 5/2016 |
|---|---|---|
| WO | 2012/114435 A1 | 8/2012 |

OTHER PUBLICATIONS

Decision to Grant a Patent received for Japanese Patent Application No. 2018-544287, dated Nov. 27, 2018, 4 pages including English Translation.

* cited by examiner

SERVO CONTROL DEVICE

CROSS-REFERENCE TO RELATED APPLICATION

The present application is based on PCT filing PCT/JP2018/012050 filed Mar. 26, 2018, which is incorporated herein by reference.

FIELD

The present invention relates to a servo control device including an instruction controller and a following controller.

BACKGROUND

A servo control device includes an instruction controller that generates a motor motion instruction according to a program and a following controller that controls a motor according to the motor motion instruction, and it starts driving the motor using an external input signal as a trigger. For example, when the following controller detects the external input signal, the following controller notifies the instruction controller of a detection signal, and the instruction controller transmits the motor motion instruction to the following controller on the basis of the notification. Thus, a delay for communication time occurs from when the following controller detects the external input signal to when motor driving is started.

Patent Literature 1 describes that position instructions from start of positioning to completion of positioning, sent from a host controller that serves as an instruction controller, are saved in a servo driver that serves as a following controller in advance so that the servo driver can drive the motor independently from the host controller.

CITATION LIST

Patent Literature

Patent Literature 1: Japanese Patent Application Laid-open No. 2004-110700

SUMMARY

Technical Problem

According to Patent Literature 1, the delay for the communication time can be reduced. However, while the motor is driven, an instruction cannot be switched to a motor motion instruction created in real time by the instruction controller; therefore, while the motor is driven, the motor motion instruction from the instruction controller cannot be corrected.

The present invention has been made in consideration of the above and an object of the present invention is to obtain a servo control device capable of correcting a motor motion instruction while a motor is driven.

Solution to Problem

To solve the above problems and to achieve the object, a servo control device according to an aspect of the present invention includes a first controller and a second controller. The first controller generates and transmits a motor motion instruction. The second controller includes: a first instruction storage unit; a second instruction storage unit; an instruction storage management unit; and a motor controller. The instruction storage management unit stores, in the first instruction storage unit, a first motor motion instruction that is a motor motion instruction generated and transmitted in advance by the first controller before an input of a motor activation signal and stores, in the second instruction storage unit, a second motor motion instruction that is a motor motion instruction generated and transmitted by the first controller after an input of the motor activation signal. The motor controller drives and controls a motor on the basis of the first motor motion instruction stored in the first instruction storage unit when the motor activation signal is input, and subsequently drives and controls the motor on the basis of the second motor motion instruction stored in the second instruction storage unit.

Advantageous Effects of Invention

A servo control device according to the present invention has an effect in that, while a motor is driven, a first motor motion instruction can be switched to a second motor motion instruction and thus a motor motion instruction can be corrected.

DESCRIPTION OF EMBODIMENTS

Hereinafter, a servo control device according to embodiments of the present invention will be described in detail with reference to the drawings. The present invention is not limited to the embodiments.

Embodiment

Figure 1:
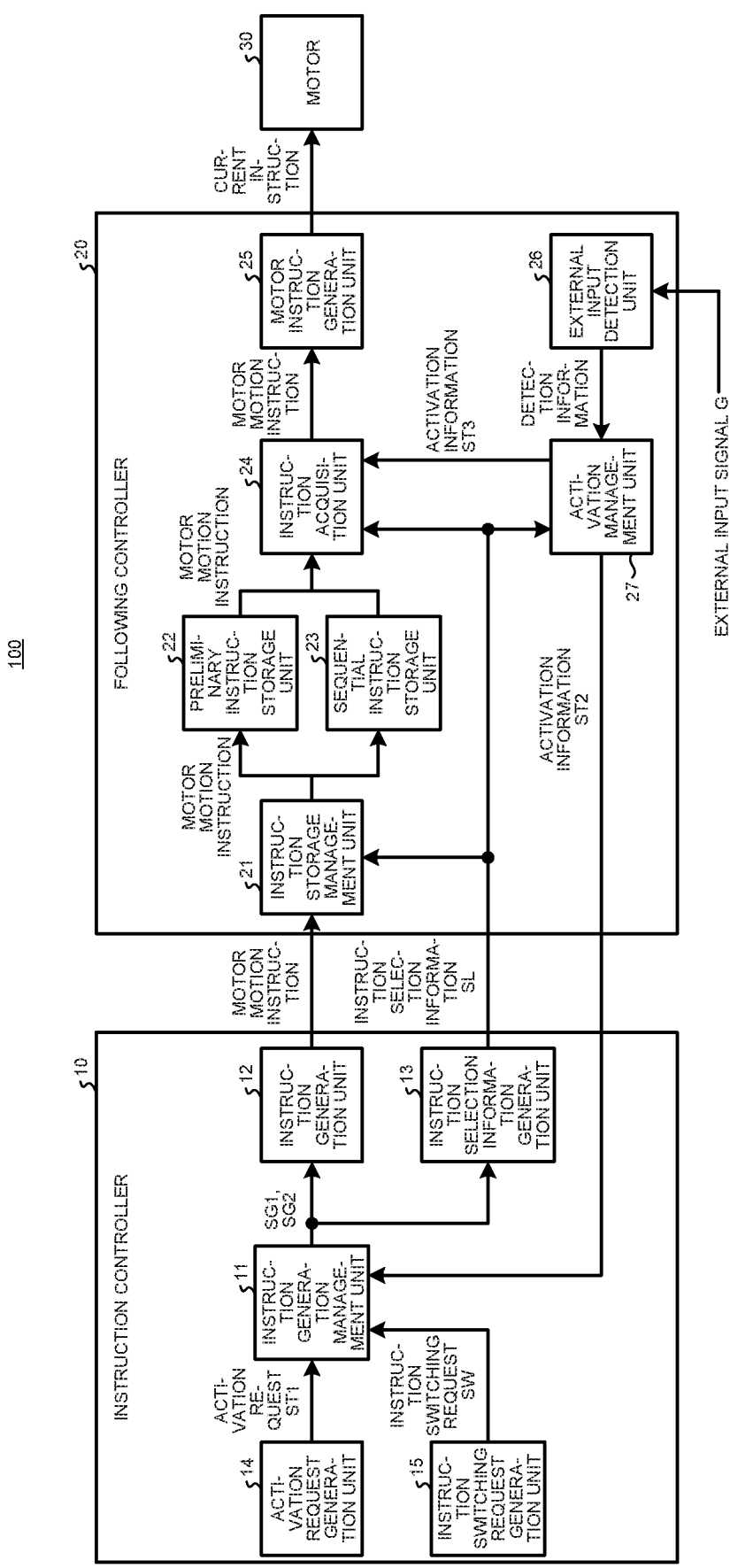
FIG. 1 is a block diagram illustrating an exemplary functional configuration of a servo control device according to an embodiment.

FIG. 1 is a block diagram illustrating an exemplary functional configuration of a servo control device according to an embodiment. A servo control device 100 includes an instruction controller 10 that is a first controller and a following controller 20 that is a second controller. In FIG. 1, an example is illustrated in which the instruction controller 10 and the following controller 20 are connected on a one-to-one basis. However, the present embodiment can be applied to a system in which a plurality of following controllers 20 are connected to a single instruction controller 10. The following controller 20 is connected to a motor 30 on a one-to-one basis.

The instruction controller 10 generates a position instruction that is a motor motion instruction for controlling the motor according to a machining program. The following controller 20 converts the position instruction transmitted from the instruction controller 10 into a current instruction and drives and controls the motor 30 according to the current instruction obtained by the conversion. The instruction controller 10 and the following controller 20 are connected via a network.

An external input signal G that is a motor activation signal is input to the following controller 20. The external input signal G functions as an activation signal of the motor 30. When an external input detection unit 26 receives the external input signal G, the external input detection unit 26 inputs detection information to an activation management unit 27. When the activation management unit 27 receives the detection information from the external input detection unit 26, the activation management unit 27 inputs activation information ST2 to an instruction generation management unit 11 of the instruction controller 10. The activation information ST2 is a signal indicating that the following controller 20 has been activated.

The instruction controller 10 includes the instruction generation management unit 11, an instruction generation unit 12, an instruction selection information generation unit 13, an activation request generation unit 14, and an instruction switching request generation unit 15. The activation request generation unit 14 generates an activation request ST1, which is a first control signal, on the basis of the machining program or the external input signal, and it inputs the activation request ST1 to the instruction generation management unit 11. The activation request ST1 is a signal for starting an operation for generating the position instruction by the instruction controller 10. The activation request ST1 is a signal that can be set such that it is generated at a given timing desired by a user. The activation request ST1 is generated before the input of the external input signal G.

The instruction switching request generation unit 15 generates an instruction switching request SW, which is a second control signal, on the basis of the machining program or the external input signal, and it inputs the instruction switching request SW to the instruction generation management unit 11. The instruction switching request SW is a signal for switching the position instruction for driving the motor 30 from a position instruction created by the instruction controller 10 before the external input signal G is input to a position instruction created by the instruction controller 10 after the external input signal G is input. The position instruction created by the instruction controller 10 before the external input signal G is input is referred to as a preliminary instruction, and the position instruction created by the instruction controller 10 after the external input signal G is input is referred to as a sequential instruction. The preliminary instruction corresponds to a first motor motion instruction in the claims, and the sequential instruction corresponds to a second motor motion instruction in the claims. The instruction switching request SW is a signal that can be set such that it is generated at a given timing desired by a user. The instruction switching request SW is generated after the external input signal G is input.

The instruction generation management unit 11 generates preliminary instruction activation information SG1 using the activation request ST1 as a trigger and inputs the generated preliminary instruction activation information SG1 to the instruction generation unit 12 and the instruction selection information generation unit 13. The instruction generation management unit 11 generates sequential instruction activation information SG2 on the basis of the activation information ST2 input from the following controller 20 and the instruction switching request SW, and it inputs the generated sequential instruction activation information SG2 to the instruction generation unit 12 and the instruction selection information generation unit 13.

The instruction generation unit 12 generates the preliminary instruction using the preliminary instruction activation information SG1 input from the instruction generation management unit 11 as a trigger for each control period T, and it generates the sequential instruction using the sequential instruction activation information SG2 input from the instruction generation management unit 11 as a trigger for each control period T. The instruction generation unit 12 transmits the generated motor motion instruction (preliminary instruction or sequential instruction) to the following controller 20.

The instruction selection information generation unit 13 generates instruction selection information SL on the basis of the preliminary instruction activation information SG1 and the sequential instruction activation information SG2 input from the instruction generation management unit 11, and it transmits the generated instruction selection information SL to the following controller 20. The instruction selection information SL is information indicating whether the position instruction transmitted from the instruction controller 10 to the following controller 20 is the preliminary instruction or the sequential instruction. The instruction selection information SL corresponds to a third control signal in the claims.

The following controller 20 includes an instruction storage management unit 21, a preliminary instruction storage unit 22 that is a first instruction storage unit, a sequential instruction storage unit 23 that is a second instruction storage unit, an instruction acquisition unit 24, a motor instruction generation unit 25, the external input detection unit 26, and the activation management unit 27. The instruction acquisition unit 24 and the motor instruction generation unit 25 correspond to a motor controller in the claims.

The instruction storage management unit 21 determines whether the received motor motion instruction is the preliminary instruction or the sequential instruction according to the instruction selection information SL received from the instruction controller 10. The instruction storage management unit 21 stores the preliminary instruction in the preliminary instruction storage unit 22 and stores the sequential instruction in the sequential instruction storage unit 23.

The preliminary instruction storage unit 22 has a buffer capacity capable of storing the preliminary instructions for a plurality of control periods. The preliminary instruction storage unit 22 is, for example, a First In First Out (FIFO) type buffer or a ring buffer. The buffer size of the preliminary instruction storage unit 22 can be changed to a given size according to the system dependent conditions such as a memory size. The sequential instruction storage unit 23 has a buffer capacity capable of storing the sequential instruction for each control period for a single control period. The sequential instruction storage unit 23 may have a buffer capacity capable of storing the sequential instructions for two or more control periods.

The activation management unit 27 generates the activation information ST2 on the basis of the detection information on the external input signal G input from the external input detection unit 26 and inputs the generated activation information ST2 to the instruction generation management unit 11 of the instruction controller 10. Furthermore, when inputting the activation information ST2 to the instruction generation management unit 11, if the instruction selection information SL indicates an instruction state where the preliminary instruction is selected, the activation management unit 27 inputs activation information ST3 to the instruction acquisition unit 24.

The instruction acquisition unit 24 obtains the preliminary instruction from the preliminary instruction storage unit 22 or the sequential instruction from the sequential instruction storage unit 23 on the basis of the instruction selection information SL and the activation information ST3 input from the activation management unit 27, and it inputs the obtained motor motion instruction to the motor instruction generation unit 25. After the activation information ST3 from the activation management unit 27 is input, the instruction acquisition unit 24 starts to operate. After the activation information ST3 is input, if the instruction selection information SL indicates the preliminary instruction, the instruction acquisition unit 24 obtains the preliminary instruction from the preliminary instruction storage unit 22.

After the activation information ST3 is input, if the instruction selection information SL indicates the sequential instruction, the instruction acquisition unit 24 obtains the sequential instruction from the sequential instruction storage unit 23.

The motor instruction generation unit 25 converts the preliminary instruction and the sequential instruction that are the position instruction input from the instruction acquisition unit 24 into the current instructions, and it outputs the current instruction obtained by the conversion to the motor 30.

Figure 2:
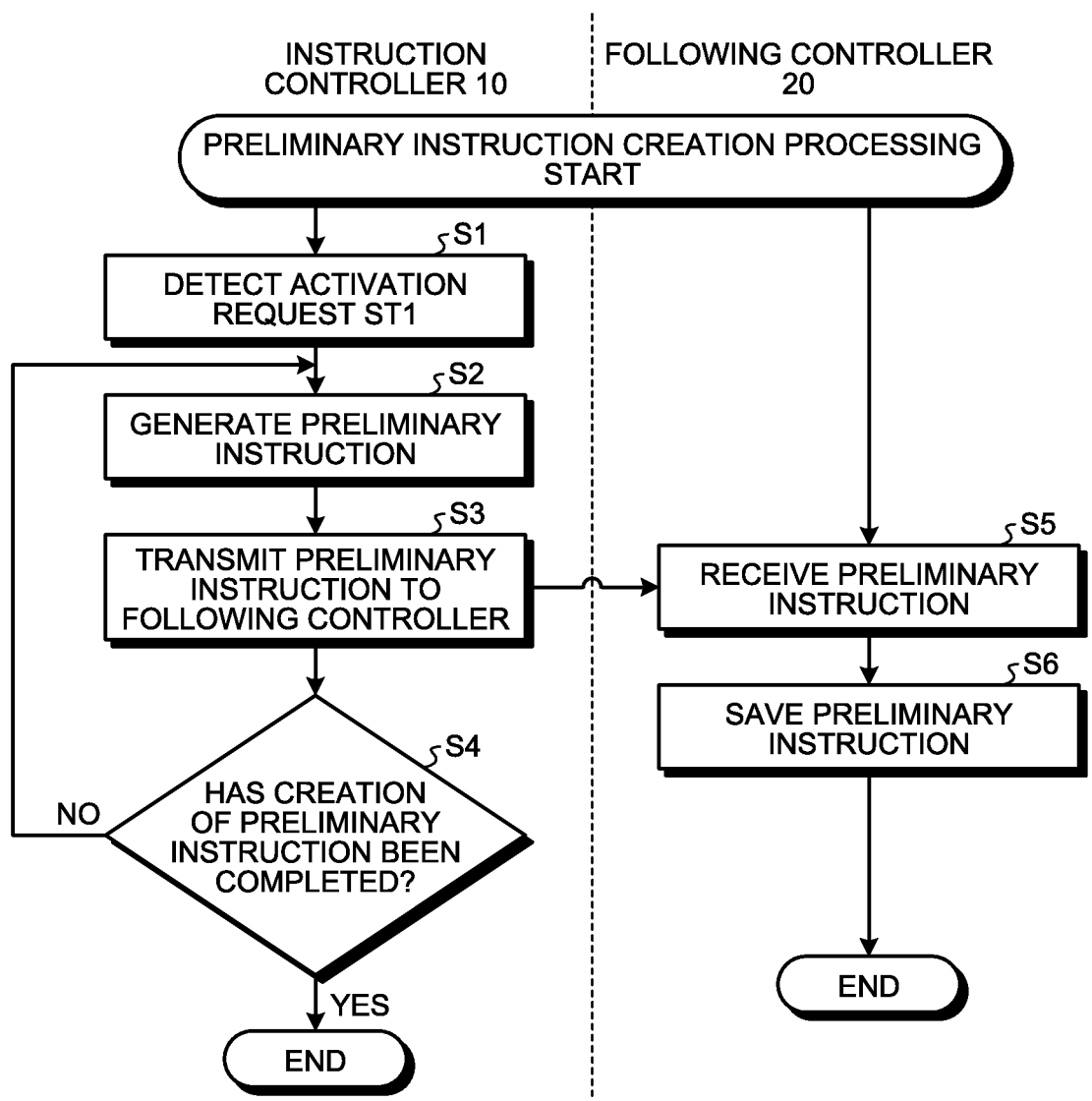
FIG. 2 is a flowchart illustrating an exemplary operation before an input of an external input signal, in the servo control device according to the embodiment.
Figure 3:
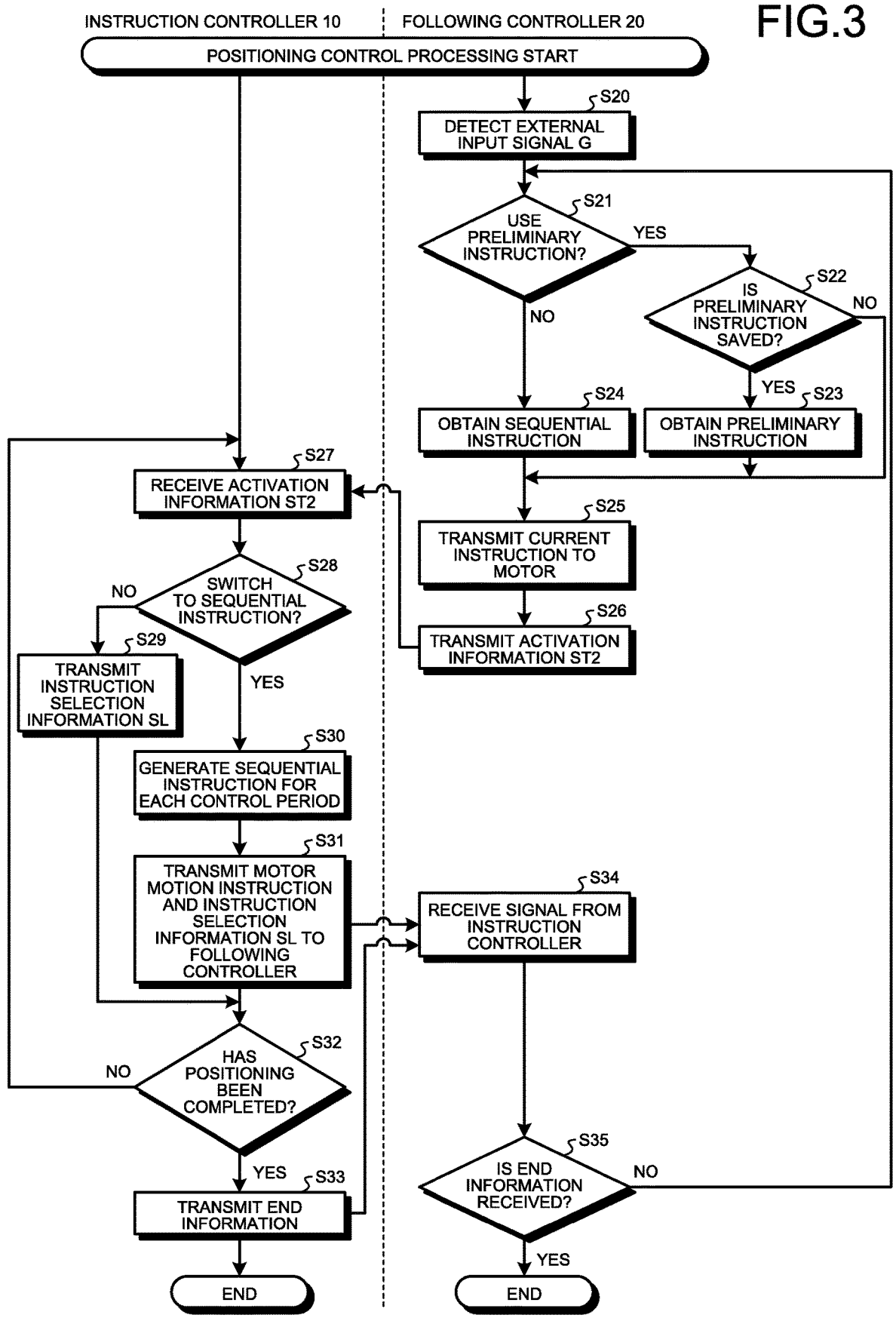
FIG. 3 is a flowchart illustrating an exemplary operation after the input of the external input signal, in the servo control device according to the embodiment.
Figure 4:
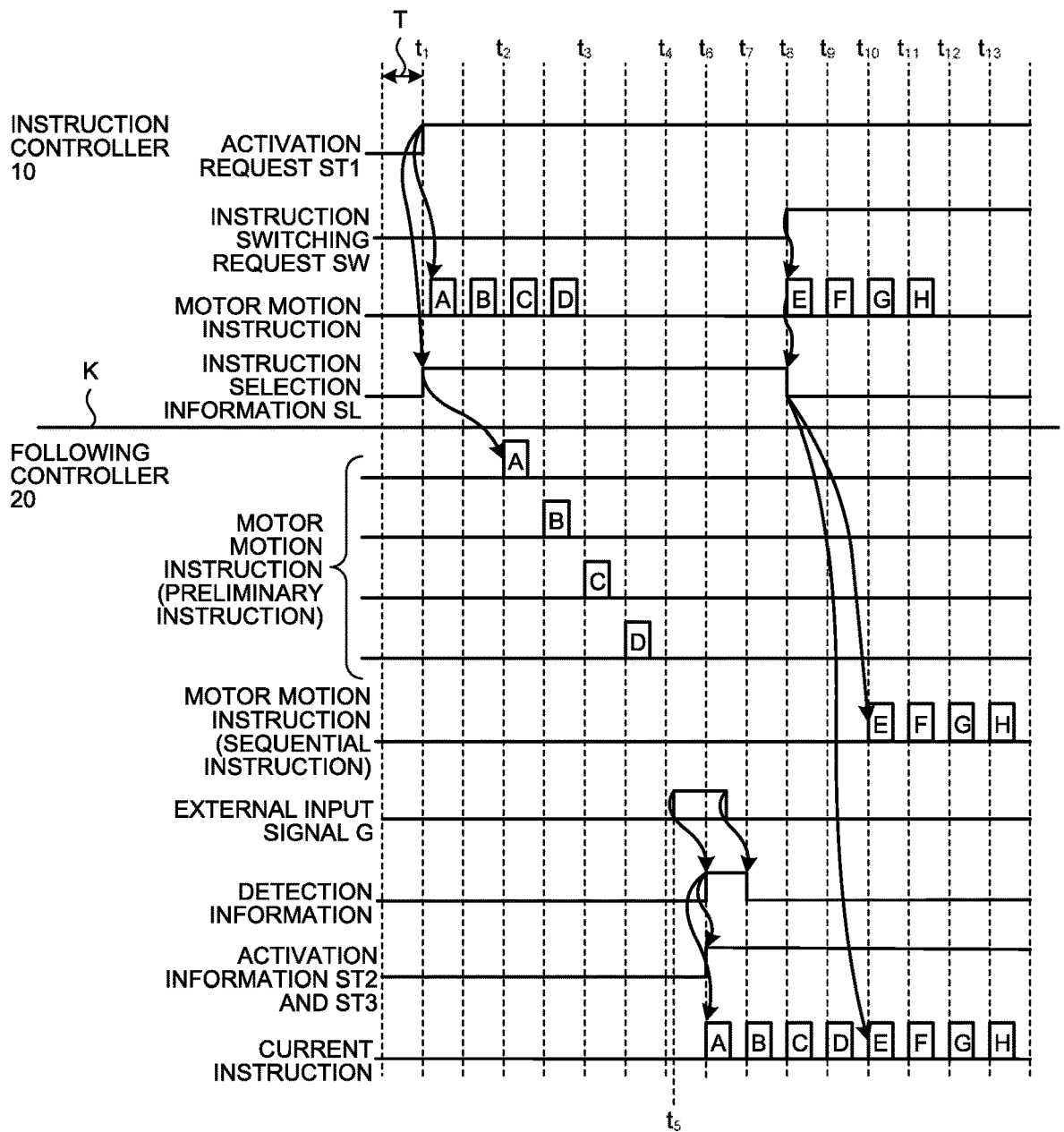
FIG. 4 is a time chart illustrating an exemplary operation of the servo control device according to the embodiment.

Next, exemplary operations of the instruction controller 10 and the following controller 20 will be described with reference to FIGS. 2, 3, and 4. FIG. 2 is a flowchart illustrating exemplary operations of the instruction controller 10 and the following controller 20 before the input of the external input signal G. FIG. 3 is a flowchart illustrating exemplary operations of the instruction controller 10 and the following controller 20 after the input of the external input signal G. FIG. 4 is a time chart illustrating states of various signals before and after the input of the external input signal G.

In FIG. 4, one section in the horizontal direction indicates the control period T of the instruction controller 10 and the following controller 20. A time chart of signals related to the instruction controller 10 is illustrated above a line K in FIG. 4. The activation request ST1, the instruction switching request SW, the motor motion instruction output from the instruction controller 10, and the instruction selection information SL are illustrated above the line K in FIG. 4. A time chart of signals related to the following controller 20 is illustrated below the line K in FIG. 4. The motor motion instruction (preliminary instruction) stored in the preliminary instruction storage unit 22, the motor motion instruction (sequential instruction) stored in the sequential instruction storage unit 23, the external input signal G, the detection information that is an output of the external input detection unit 26, the activation information ST2 (ST3), and the current instruction output from the motor instruction generation unit 25 are illustrated below the line K in FIG. 4. In the time chart in FIG. 4, it is assumed that a delay of two control periods 2T occurs before the signal transmitted from the instruction controller 10 is received by the following controller 20. Similarly, a delay of two control periods 2T occurs before a signal transmitted from the following controller 20 is received by the instruction controller 10.

First, an operation before the external input signal G is input will be described with reference to FIGS. 2 and 4.

When an activation request is input by the machining program or the external input signal, the activation request generation unit 14 turns on the activation request ST1 and inputs the activation request ST1 to the instruction generation management unit 11 (FIG. 4, time t1). At the time t1, the instruction switching request SW is in an off-state. When detecting the activation of the activation request ST1 (step S1), the instruction generation management unit 11 generates the preliminary instruction activation information SG1 and inputs the generated preliminary instruction activation information SG1 to the instruction generation unit 12 and the instruction selection information generation unit 13.

When the preliminary instruction activation information SG1 is input, the instruction generation unit 12 sequentially generates the preliminary instruction for each control period T (step S2). The number of preliminary instructions to be created, i.e., the number of control periods for which the preliminary instructions are created, can be specified by a parameter that can be set by a user. In a case of FIG. 4, four preliminary instructions "A", "B", "C", and "D" are created (times t1 to t3). When the preliminary instruction activation information SG1 is input, the instruction selection information generation unit 13 generates the instruction selection information SL indicating that the motor motion instruction transmitted from the instruction controller 10 to the following controller 20 is the preliminary instruction. That is, when the preliminary instruction activation information SG1 is input, the instruction selection information generation unit 13 turns on the instruction selection information SL. Thereafter, the instruction selection information generation unit 13 keeps the instruction selection information SL on until the sequential instruction activation information SG2 from the instruction generation management unit 11 is turned on.

After the generation of the instruction, the instruction generation unit 12 transmits the preliminary instruction to the following controller 20 (step S3). Furthermore, the instruction selection information generation unit 13 turns on the instruction selection information SL and transmits the instruction selection information SL to the following controller 20. The instruction generation unit 12 and the instruction selection information generation unit 13 determine whether the creation and transmission of the preliminary instructions for the number of times set by the user have been completed (step S4) and repeat processing in steps S2 and S3 until the creation and the transmission of the preliminary instructions for the above number of times are completed.

When receiving the motor motion instruction (step S5), the instruction storage management unit 21 determines whether the received motor motion instruction is the preliminary instruction or the sequential instruction on the basis of the instruction selection information SL. If the motor motion instruction is the preliminary instruction, the instruction storage management unit 21 stores the received motor motion instruction in the preliminary instruction storage unit 22. Furthermore, if the motor motion instruction is the sequential instruction, the instruction storage management unit 21 inputs the received motor motion instruction to the sequential instruction storage unit 23. In this exemplary operation, the received motor motion instruction is the preliminary instruction; therefore, the instruction storage management unit 21 stores the received preliminary instructions "A", "B", "C", and "D" in the preliminary instruction storage unit 22 (step S6, times t2 to t4).

Next, an operation after the external input signal G is input will be described with reference to FIGS. 3 and 4. Operations in steps S21 to S35 illustrated in FIG. 3 indicate operations in a single control period T. When the external input detection unit 26 detects the external input signal G (time t5), the external input detection unit 26 inputs the detection information to the activation management unit 27 (FIG. 3, step S20, time t6). The activation management unit 27 makes an assessment of the instruction selection information SL, and if the instruction selection information SL indicates the preliminary instruction, the activation management unit 27 inputs the activation information ST3 to the instruction acquisition unit 24.

When the activation information ST3 is input, the instruction acquisition unit 24 determines the state of the instruction selection information SL and determines whether the motor motion instruction is stored in the preliminary instruction storage unit 22 (steps S21 and S22). If the instruction selection information SL indicates the preliminary instruction and the motor motion instruction is stored in the preliminary instruction storage unit 22, the instruction acquisition unit 24 obtains the preliminary instruction from the preliminary instruction storage unit 22 and inputs the obtained preliminary instruction to the motor instruction generation unit 25 (step S23). If the instruction selection information SL indicates the preliminary instruction and the motor motion instruction is not stored in the preliminary instruction storage unit 22 (step S22, No), the instruction acquisition unit 24 may not necessarily output the motor motion instruction to the motor instruction generation unit 25 or the instruction acquisition unit 24 may input, to the motor instruction generation unit 25, the motor motion instruction that is the same as the motor motion instruction in the previous control period.

The motor instruction generation unit 25 converts the input motor motion instruction into the current instruction and transmits the current instruction to the motor 30 (step S25). In addition, the activation management unit 27 turns on the activation information ST2 and transmits the activation information ST2 to the instruction controller 10 (step S26). Note that the operation in step S26 may be performed between steps S20 and S21.

The operation of the following controller 20 in a period between the times t6 and t7 in FIG. 4 will be described. At the time t6, the external input detection unit 26 turns on a detection signal. Furthermore, since the instruction selection information SL indicates the preliminary instruction at the time t6, the activation management unit 27 turns on the activation information ST3. With this operation, the instruction acquisition unit 24 determines the state of the instruction selection information SL and determines whether the motor motion instruction is stored in the preliminary instruction storage unit 22. At the time t6, since the instruction selection information SL indicates the preliminary instruction, Yes is determined in the determination in step S21. Furthermore, since the preliminary instructions "A", "B", "C", and "D" are stored in the preliminary instruction storage unit 22, Yes is determined in the determination in step S22. Thus, the instruction acquisition unit 24 obtains the preliminary instruction "A" from the preliminary instruction storage unit 22 at the time t6 (step S23). The motor instruction generation unit 25 converts the preliminary instruction "A" into the current instruction and transmits the current instruction to the motor 30 (step S25). The activation management unit 27 transmits, to the instruction controller 10, the activation information ST2 that has been turned on (step S26).

Since the instruction selection information SL indicates the preliminary instruction and the preliminary instructions "B", "C", and "D" are stored in the preliminary instruction storage unit 22 at the time t7, the instruction acquisition unit 24 obtains the preliminary instruction "B" from the preliminary instruction storage unit 22 at the time t7 (step S23). The motor instruction generation unit 25 converts the preliminary instruction "B" into the current instruction and transmits the current instruction to the motor 30 (step S25). The activation management unit 27 transmits, to the instruction controller 10, the activation information ST2 that has been turned on (step S26).

At a time t8, although the state of the instruction selection information SL transmitted from the instruction controller 10 is switched to an off-state in which the instruction selection information SL indicates the sequential instruction, as described above, a delay of two control periods 2T occurs before the following controller 20 detects the switching from on to off. This means that the following controller 20 detects the switching from on to off of the instruction selection information SL at a time t10. Thus, the instruction selection information SL indicates the preliminary instruction and the preliminary instructions "C" and "D" are stored in the preliminary instruction storage unit 22 at the time t8; therefore, the instruction acquisition unit 24 obtains the preliminary instruction "C" from the preliminary instruction storage unit 22 at the time t8 (step S23). The motor instruction generation unit 25 converts the preliminary instruction "C" into the current instruction and transmits the current instruction to the motor 30 (step S25). The activation management unit 27 transmits, to the instruction controller 10, the activation information ST2 that has been turned on (step S26).

Since the instruction selection information SL indicates the preliminary instruction and the preliminary instruction "D" is stored in the preliminary instruction storage unit 22 at a time t9, the instruction acquisition unit 24 obtains the preliminary instruction "D" from the preliminary instruction storage unit 22 at the time t9 (step S23). The motor instruction generation unit 25 converts the preliminary instruction "D" into the current instruction and transmits the current instruction to the motor 30 (step S25). The activation management unit 27 transmits, to the instruction controller 10, the activation information ST2 that has been turned on (step S26).

In FIG. 3, the instruction controller 10 receives, from the following controller 20, the activation information ST2 that has been turned on (step S27). On the basis of the instruction switching request SW, the instruction generation management unit 11 determines whether to start creation of the sequential instruction subsequent to the preliminary instruction that has been previously created (step S28). If the instruction switching request SW does not indicate switching, the instruction generation management unit 11 does not turn on the sequential instruction activation information SG2. In this case, the instruction generation unit 12 does not perform a creation operation of the motor motion instruction, and the instruction selection information generation unit 13 maintains the instruction selection information SL in the state indicating the preliminary instruction (step S29).

In contrast, if the instruction switching request SW indicates switching, the instruction generation management unit 11 turns on the sequential instruction activation information SG2. The instruction generation unit 12 generates the sequential instruction for each control period using the activation of the sequential instruction activation information SG2 input from the instruction generation management unit 11 as a trigger, and it transmits the sequential instruction to the following controller 20 (steps S30 and S31). Furthermore, the instruction selection information generation unit 13 switches the instruction selection information SL to the state where the instruction selection information SL indicates the sequential instruction using the activation of the sequential instruction activation information SG2 as a trigger (step S31).

An operation of the instruction controller 10 in a period between the time t6 and the time t11 in FIG. 4 will be described. The activation information ST2 is turned on at the time t6. The instruction generation management unit 11 detects the activation of the activation information ST2 at the time t8 that is a time point after a lapse of two control periods from the time t6. Since the activation information ST2 is off at the time t6, the instruction generation management unit 11 does not transmit the sequential instruction activation information SG2 to the instruction generation unit 12 and the instruction selection information generation unit 13 yet. Thus, at the time t6, the instruction generation unit 12 does not perform the creation operation of the motor motion instruction, and the instruction selection information generation unit 13 keeps the instruction selection information SL on. A similar operation is also performed at the time t7.

The instruction generation management unit 11 detects the activation of the activation information ST2 at the time t8 (step S27) and detects the activation of the instruction switching request SW (step S28). Thus, the instruction generation management unit 11 turns on the sequential instruction activation information SG2 at the time t8. With this operation, the instruction generation unit 12 creates a sequential instruction "E" subsequent to the preliminary instruction "D" and transmits the sequential instruction "E" to the following controller 20 at the time t8. Thereafter, a sequential instruction "F" is transmitted to the following controller 20 at the time t9, a sequential instruction "G" is transmitted to the following controller 20 at the time t10, and a sequential instruction "H" is transmitted to the following controller 20 at the time t11. Furthermore, after the time t8, the instruction selection information generation unit 13 switches the state of the instruction selection information SL to an off-state in which the instruction selection information SL indicates the sequential instruction. The following controller 20 detects the switching of the instruction selection information SL from on to off at the time t10 that is a time point after a lapse of two control periods from the time t8.

If the instruction switching request SW is turned on after the time point at which the instruction generation management unit 11 detects the activation of the activation information ST2, No is determined in the determination in step S28 during a period from when the instruction generation management unit 11 detects the activation of the activation information ST2 to when the instruction switching request SW is turned on and the processing in step S29 is performed. In step S29, the instruction generation unit 12 does not perform the creation operation of the motor motion instruction, and the instruction selection information generation unit 13 keeps the instruction selection information SL on.

In the following controller 20, the sequential instruction "E" is stored in the sequential instruction storage unit 23 at the time t10, the sequential instruction "F" is stored in the sequential instruction storage unit 23 at the time t11, the sequential instruction "G" is stored in the sequential instruction storage unit 23 at a time t12, and the sequential instruction "H" is stored in the sequential instruction storage unit 23 at a time t13.

In FIG. 3, the following controller 20 receives the signal from the instruction controller 10 (motor motion instruction, instruction selection information SL, and end information) (step S34). The following controller 20 determines whether the end information is received (step S35). If the end information is not received, the following controller 20 advances the procedure to step S21.

If the instruction selection information SL indicates the sequential instruction in step S21 in FIG. 3 (step S21, No), the instruction acquisition unit 24 obtains the sequential instruction from the sequential instruction storage unit 23 and inputs the obtained sequential instruction to the motor instruction generation unit 25 (step S24). The motor instruction generation unit 25 converts the input sequential instruction into the current instruction and transmits the current instruction to the motor 30 (step S25). Furthermore, the activation management unit 27 transmits, to the instruction controller 10, the activation information ST2 that has been turned on (step S26).

The operation of the following controller 20 in a period between the time t10 and the time t13 in FIG. 4 will be described. At the time t10, the instruction selection information SL indicates the sequential instruction. Thus, the instruction acquisition unit 24 obtains the sequential instruction "E" from the sequential instruction storage unit 23 at the time t10 (step S24). The motor instruction generation unit 25 converts the sequential instruction "E" into the current instruction and transmits the current instruction to the motor 30 (step S25). The activation management unit 27 transmits, to the instruction controller 10, the activation information ST2 that has been turned on (step S26). A similar processing is performed at the times t11, t12, and t13, and the sequential instructions "F", "G", and "H" are output to the motor 30.

If a positioning operation is stopped or completed (step S32), the instruction controller 10 transmits, to the following controller 20, the end information indicating the completion or stop of the positioning (step S33). When the position reaches a target position in the positioning control, when a user inputs a stop instruction, or when the operation is stopped due to an error, the instruction controller 10 generates the end information and transmits the end information to the following controller 20. When the following controller 20 receives the end information from the instruction controller 10 (step S35, Yes), the following controller 20 ends the operation. The instruction controller 10 repeatedly performs the processing in steps S27 to S33 until the positioning is completed, and the following controller 20 repeatedly performs the operations in steps S21 to S26 and S34 and S35 until the following controller 20 receives the end information.

Figure 5:
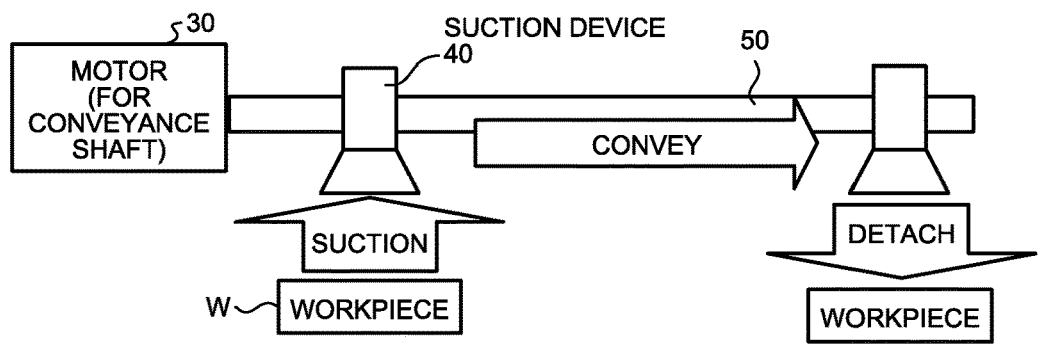
FIG. 5 is a diagram illustrating a machining apparatus driven by the servo control device according to the embodiment.

FIG. 5 is a diagram illustrating an example of a machining apparatus controlled by the servo control device 100. The machining apparatus includes a suction device 40 that suctions, i.e., attracts, a workpiece W, a conveyance shaft 50, and the motor 30 that drives the conveyance shaft 50 to drive and convey the suction device 40 along the conveyance shaft 50. The machining apparatus performs a first process of suctioning the workpiece W by the suction device 40, a second process of driving the motor 30 to convey the suction device 40 suctioning the workpiece W along the conveyance shaft 50 from the suction position to the detaching position, and a third process of detaching the workpiece W that has reached the detaching position from the suction device 40.

When the suction operation of the workpiece W by the suction device 40 ends, the external input signal G is input to the servo control device 100. Before the input of the external input signal G, the machining program or an external input is set such that the activation request ST1 is generated. Furthermore, for example, the machining program or the external input is set such that the instruction switching request SW is generated in which a series of position instructions related to the conveyance operation of the workpiece W from the suction position to the detaching position is set as the preliminary instructions. Furthermore, the number of series of preliminary instructions (the number of control periods) related to the conveyance operation of the workpiece W from the suction position to the detaching position is set as a parameter. With this setting, the conveyance operation of the suction device 40 based on the preliminary instruction is started immediately after the input of the external input signal G, and the suction device 40 is conveyed from the suction position to the detaching position by the preliminary instruction. The suction device 40 that has been conveyed to the detaching position is driven by the sequential instruction generated after the preliminary instruction, and the next process is performed. In this way, after the input of the external input signal G, the conveyance operation of the suction device 40 can be performed without delay. Furthermore, the preliminary instruction can be switched to the sequential instruction by the instruction switching request SW while the motor is in operation at a given timing intended by a user. Since the sequential instruction is not generated in advance before the input of the external input signal G unlike the preliminary instruction, the sequential instruction can be corrected while the motor is driven.

Figure 6:
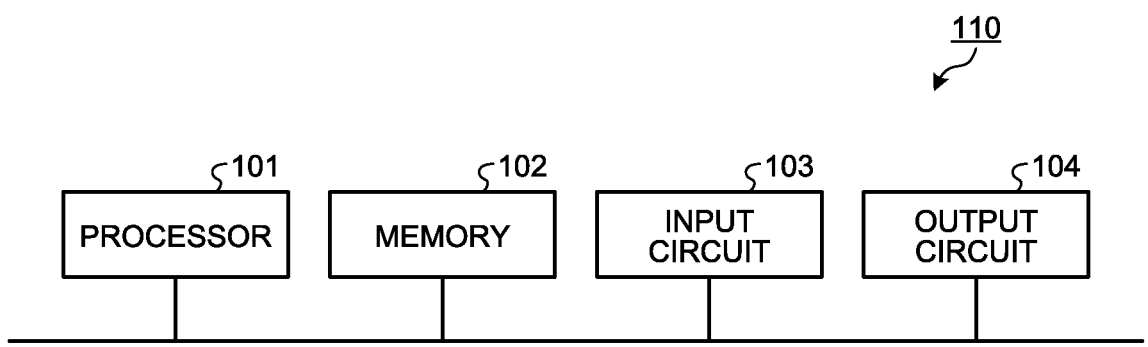
FIG. 6 is a block diagram illustrating an exemplary hardware configuration of the servo control device according to the embodiment.

Next, a hardware configuration for realizing the instruction controller 10 and the following controller 20 illustrated in FIG. 1 will be described. The instruction controller 10 and the following controller 20 can be realized by a processing circuit 110 illustrated in FIG. 6.

The processing circuit 110 includes a processor 101, a memory 102, an input circuit 103, and an output circuit 104. The processor 101 is, for example, a central processing unit (CPU) (also referred to as processing device, computing device, microprocessor, microcomputer, processor, and digital signal processor (DSP)) and a system large scale integration (LSI). The memory 102 is, for example, a nonvolatile or a volatile semiconductor memory such as a random access memory (RAM), a read only memory (ROM), a flash memory, an erasable programmable read only memory (EPROM), an electrically erasable programmable read-only memory (EEPROM, registered trademark), a magnetic disk, a flexible disk, an optical disk, a compact disk, a mini disk, or a digital versatile disc (DVD).

Each component included in the instruction controller 10 and each component included in the following controller 20 can be realized by the processor 101 reading corresponding programs from the memory 102 and executing the read programs. The input circuit 103 is used when receiving information to be processed by the processor 101 and information to be stored in the memory 102 from an external device, and the output circuit 104 is used when outputting information generated by the processor 101 and information stored in the memory 102 to an external device.

Note that the motor instruction generation unit 25 of the following controller 20 is realized by a dedicated circuit such as a conversion circuit for converting a voltage supplied from an external device and generating a voltage to be applied to the motor 30 and a control circuit for controlling the conversion circuit.

In this way, in the present embodiment, the preliminary instruction can be switched to the sequential instruction while the motor is in operation. Therefore, the sequential instruction can be corrected while the motor is driven.

The configurations illustrated in the above embodiment are merely examples of an aspect of the present invention and can be combined with other known techniques. Furthermore, the configurations illustrated in the embodiment can be partially omitted or changed without departing from the scope of the present invention.

REFERENCE SIGNS LIST

10 instruction controller; 11 instruction generation management unit; 12 instruction generation unit; 13 instruction selection information generation unit; 14 activation request generation unit; 15 instruction switching request generation unit; 20 following controller; 21 instruction storage management unit; 22 preliminary instruction storage unit; 23 sequential instruction storage unit; 24 instruction acquisition unit; 25 motor instruction generation unit; 26 external input detection unit; 27 activation management unit; 30 motor; 40 suction device; 50 conveyance shaft; 100 servo control device; W workpiece.

The invention claimed is:

1. A servo control device comprising:
   first controller circuitry to generate and transmit a motor motion instruction; and
   second controller circuitry,
   wherein the second controller circuitry includes:
      a first instruction memory;
      a second instruction memory;
      an instruction storage management circuitry to store, in the first instruction memory, a first motor motion instruction that is a motor motion instruction generated and transmitted in advance by the first controller circuitry before an input of a motor activation signal and to store, in the second instruction memory, a second motor motion instruction that is a motor motion instruction generated and transmitted by the first controller circuitry after an input of the motor activation signal; and
      motor controller circuitry to drive and control a motor on a basis of the first motor motion instruction stored in the first instruction memory when the motor activation signal is input, and subsequently drive and control the motor on a basis of the second motor motion instruction stored in the second instruction memory.

2. The servo control device according to claim 1, wherein the first controller circuitry generates the first motor motion instruction using a first control signal as a trigger and transmits the first motor motion instruction to the second controller circuitry.

3. The servo control device according to claim 2, wherein the first controller circuitry generates the second motor motion instruction using a second control signal as a trigger and transmits the second motor motion instruction to the second controller circuitry.

4. The servo control device according to claim 3, wherein the first controller circuitry generates a third control signal for selecting either one of the first motor motion instruction and the second motor motion instruction on a basis of the first control signal and the second control signal and transmits the third control signal to the second controller circuitry, and
the instruction storage management circuitry stores the first motor motion instruction in the first instruction memory and stores the second motor motion instruction in the second instruction memory on a basis of the third control signal.

5. The servo control device according to claim 4, wherein the motor controller circuitry switches the first motor motion instruction to the second motor motion instruction on a basis of the motor activation signal and the third control signal.

6. The servo control device according to claim 5, wherein a number of first motor motion instructions is set as a parameter.

7. The servo control device according to claim 4, wherein a number of first motor motion instructions is set as a parameter.

8. The servo control device according to claim 3, wherein a number of first motor motion instructions is set as a parameter.

9. The servo control device according to claim 2, wherein a number of first motor motion instructions is set as a parameter.

10. The servo control device according to claim 1, wherein a number of first motor motion instructions is set as a parameter.

\* \* \* \* \*